United States Patent
Appell et al.

(10) Patent No.: US 11,407,842 B2
(45) Date of Patent: Aug. 9, 2022

(54) METHOD FOR CONTROLLED PREPARATION OF LOW MOLECULAR WEIGHT CELLULOSE ETHER

(71) Applicant: DOW GLOBAL TECHNOLOGIES LLC, Midland, MI (US)

(72) Inventors: Robert B. Appell, Wilmington, DE (US); Joseph L Weir, Wilmington, DE (US)

(73) Assignee: NUTRITION & BIOSCIENCES USA 1, LLC, Rochester, NY (US)

( * ) Notice: Subject to any disclaimer, the term of this patent is extended or adjusted under 35 U.S.C. 154(b) by 0 days.

(21) Appl. No.: 16/608,892

(22) PCT Filed: Jun. 29, 2018

(86) PCT No.: PCT/US2018/040196
§ 371 (c)(1),
(2) Date: Oct. 28, 2019

(87) PCT Pub. No.: WO2019/036123
PCT Pub. Date: Feb. 21, 2019

(65) Prior Publication Data
US 2020/0181290 A1    Jun. 11, 2020

Related U.S. Application Data

(60) Provisional application No. 62/546,046, filed on Aug. 16, 2017.

(51) Int. Cl.
*C08B 11/08* (2006.01)
(52) U.S. Cl.
CPC .................................. *C08B 11/08* (2013.01)
(58) Field of Classification Search
CPC .......... C08B 11/00; C08B 15/00; C08B 11/08
See application file for complete search history.

(56) References Cited

U.S. PATENT DOCUMENTS

| | | | | |
|---|---|---|---|---|
| 2,397,439 A | * | 3/1946 | Schwartz | ................ A24F 15/12 150/131 |
| 3,137,736 A | * | 6/1964 | Prinz | ........................ C07C 45/86 568/422 |
| 3,391,135 A | | 7/1968 | Ouno | |
| 6,261,218 B1 | | 7/2001 | Schulz | |
| 9,487,594 B2 | * | 11/2016 | Narita | ..................... C08B 11/00 |
| 2001/0007028 A1 | | 7/2001 | Schulz | |
| 2009/0176277 A1 | | 7/2009 | Hayakawa et al. | |

FOREIGN PATENT DOCUMENTS

| | | |
|---|---|---|
| EP | 2754673 A1 | 7/2014 |
| WO | WO 93/15116 A1 | 8/1993 |
| WO | WO 00/63254 A1 | 10/2000 |
| WO | WO 01/00680 A1 | 10/2001 |
| WO | WO 2004/007559 A1 | 1/2004 |

OTHER PUBLICATIONS

Uchiyama et al., "Derivatization of Carbonyl Compounds with 2,4-dinitrophenylhydrazine and their Subsequent Determination by High-performance Liquid Chromatography", Journal of Chromatography B, 2011, vol. 879, pp. 1282-1289.

* cited by examiner

*Primary Examiner* — Shaojia A Jiang
*Assistant Examiner* — Everett White

(57) ABSTRACT

A process includes: (a) providing an initial cellulose ether powder containing 0.5 to 10 weight-percent water based on total cellulose ether powder weight; (b) heating the initial cellulose ether powder to a temperature in a range of 30 to 130 degrees Celsius; (c) before, during and/or after heating in step (b), adding solid base to the cellulose ether powder and mixing with the initial cellulose ether powder to form a cellulose ether/base mixture; (d) adding volatile acid to the cellulose ether/base mixture and mixing; and (e) allowing the volatile acid to hydrolyze the initial cellulose ether to form a final cellulose ether having a lower viscosity than the initial cellulose ether.

13 Claims, 1 Drawing Sheet

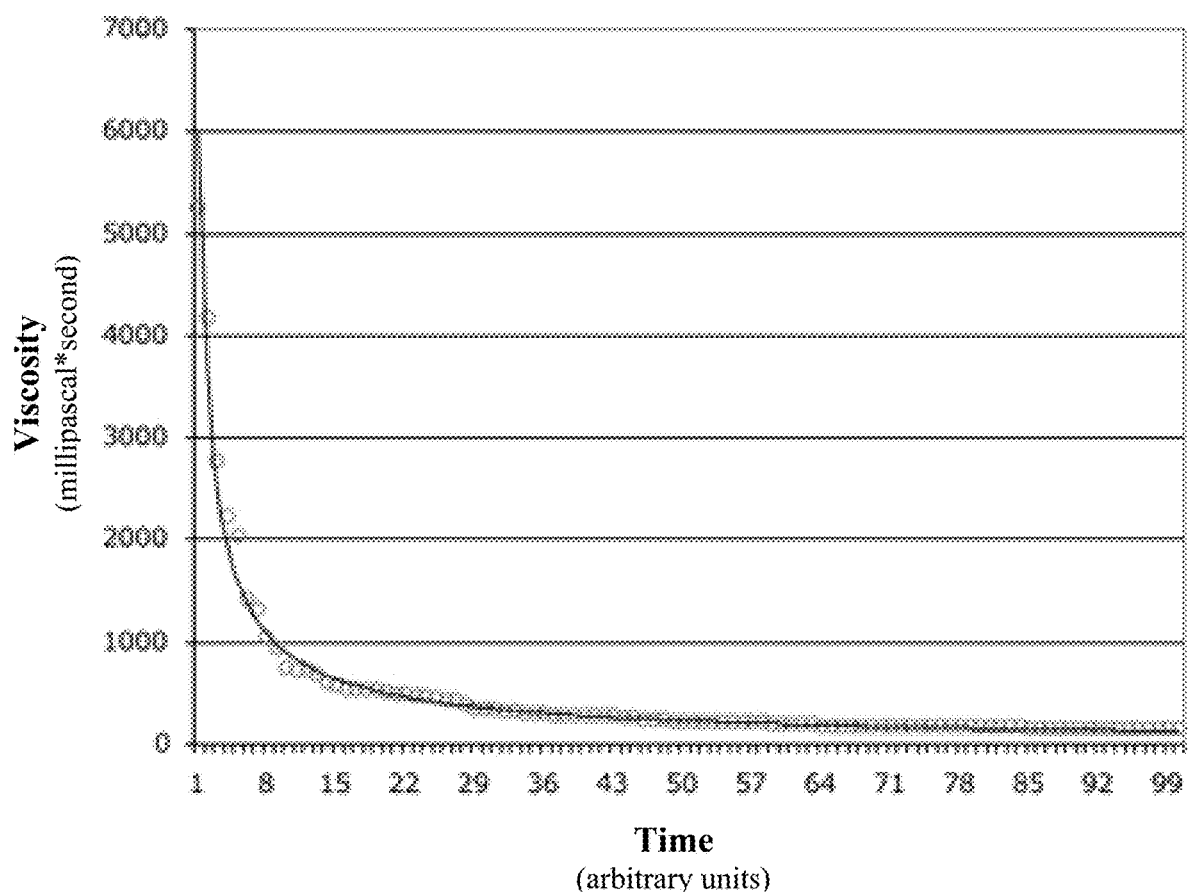

METHOD FOR CONTROLLED PREPARATION OF LOW MOLECULAR WEIGHT CELLULOSE ETHER

BACKGROUND OF THE INVENTION

Field of the Invention

The present invention relates to acid-catalyzed hydrolysis of cellulose ether to a lower viscosity cellulose ether.

Introduction

Cellulose ethers having a certain viscosity can be modified to lower viscosity cellulose ether by acid-catalyzed hydrolysis. Viscosity of cellulose ethers follow molecular weight of the cellulose ether such that higher molecular weight cellulose ethers have higher viscosities than lower molecular weight cellulose ethers. Hydrolysis of higher molecular weight cellulose ethers yields lower molecular weight/viscosity cellulose ethers.

U.S. Pat. No. 6,261,218 describes an exemplary acid-catalyzed hydrolysis process for cellulose ether where high molecular weight (high viscosity) cellulose ether powder is tumbled in a reactor while it is exposed to acid at a temperature of 50-130 degrees Celsius (° C.). To stop the hydrolysis reaction the acid catalyst is quenched by addition of a base to the tumbling reactor. Neutralizing the acid catalyst with the base ceases the hydrolysis reaction yielding a cellulose ether having a lower molecular weight and lower viscosity than the starting cellulose ether. The challenge with the process is to stop the reaction precisely at a target cellulose ether viscosity because quenching the acid with base is not instantaneous. As a result, controlling the hydrolysis to yield a cellulose ether product even near a target viscosity requires experience in a particular process and an ability to predict when to add base and how much to add to quench the acid to the target cellulose ether product.

FIG. 1 provides an illustration of a representative viscosity versus time curve for such an acid-catalyzed hydrolysis of cellulose ether at a given temperature. The initial drop in cellulose ether viscosity is rapid with a relatively steep initial viscosity drop followed by an inflection point and a long tail to a final viscosity. Using such a hydrolysis process to reproducibly obtain cellulose ether having a specific viscosity, especially a specific viscosity of approximately 500 milliPascal*second (mPa*s) or more, is a challenge because the viscosity is changing so rapidly in this range during the reaction. Any variation in the process from one run to the next can result in a dramatic change in the viscosity of the cellulose ether product in this range. Even just identifying what reaction parameters are needed to produce a cellulose ether close to a target viscosity product in this range is a challenge.

Lowering the temperature of the reaction can temper the rate of the reaction and render the initial viscosity drop less steep with respect to time. However, lowering the temperature also reduces the reaction kinetics, resulting in requiring a longer reaction time (hydrolysis and quenching of the hydrolysis) to achieve a product having a stable final viscosity. As a result, lowering the temperature tends to slow the reaction without providing much of an increase in accuracy and precision in obtaining a specific intermediate viscosity cellulose ether.

It is desirable to identify a process for hydrolyzing high viscosity cellulose ether with greater control over the hydrolysis end point to more accurately and reproducibly prepare cellulose ether product, especially cellulose ether product having a viscosity of 500 mPa*s or more, and for such a process to produce a final cellulose ether with a stable viscosity in a shorter period of time than current acid-catalyzed hydrolysis processes.

BRIEF SUMMARY OF THE INVENTION

The present invention provides a solution to the problem of identifying a process for hydrolyzing high viscosity cellulose ether with greater control over the hydrolysis end point to more accurately and precisely prepare cellulose ether product, especially cellulose ether product having a viscosity of 500 mPa*s or more, and for such a process to produce a final cellulose ether with a stable viscosity in a shorter period of time than current acid-catalyzed hydrolysis processes The present invention requires adding base to cellulose ether before adding acid, differing from typical acid-catalyzed hydrolysis process where base is added after hydrolysis. The present invention is a result of surprisingly and unexpectedly discovering that base can be added first to the high viscosity cellulose ether before adding acid to temper the hydrolysis reaction rate and thereby provide greater control over resulting cellulose ether product viscosity.

Even more surprising is the discovery that the process of the present invention produces a final cellulose ether that comprises a lower formaldehyde concentration relative to commercially available cellulose ethers having comparable viscosities.

In a first aspect, the present invention is a process comprising: (a) providing an initial cellulose ether powder comprising 0.5 to 10 weight-percent water based on total cellulose ether powder weight; (b) heating the initial cellulose ether powder to a temperature in a range of 30 to 130 degrees Celsius; (c) before, during and/or after heating in step (b), adding solid base to the cellulose ether powder and mixing with the initial cellulose ether powder to form a cellulose ether/base mixture; (d) adding volatile acid to the cellulose ether/base mixture and mixing; and (e) allowing the volatile acid to hydrolyze the initial cellulose ether to form a final cellulose ether having a lower viscosity than the initial cellulose ether.

The present invention is useful for preparing cellulose ether products having a viscosity of one or more millipascal*second from cellulose ether having a higher viscosity than the target cellulose ether product and doing so faster and more reproducibly than existing acid catalyzed hydrolysis processes.

BRIEF DESCRIPTION OF THE DRAWINGS

FIG. 1 illustrates a plot showing an exemplary cellulose ether viscosity versus time curve for acid-catalyzed hydrolysis of high viscosity cellulose ether. The plot illustrates the curve for a typical process where acid is added to the cellulose ether in an absence of base, similar to the process described in U.S. Pat. No. 6,261,218.

DETAILED DESCRIPTION OF THE INVENTION

Test methods refer to the most recent test method as of the priority date of this document unless a date is indicated with the test method number. References to test methods contain both a reference to the testing society and the test method number. Test method organizations are referenced by one of the following abbreviations: ASTM refers to ASTM International (formerly known as American Society for Testing and Materials); EN refers to European Norm; DIN refers to Deutsches Institute für Normung; and ISO refers to International Organization for Standards. USP40-NF35 refers to United States Pharmacopeial ($40^{th}$ revision) and the National Formulary standards ($35^{th}$ edition) and their supplements, dated 1 May 2017.

"And/or" means "and, or as an alternative". "Multiple" means two or more. All ranges include endpoints unless otherwise indicated.

Cellulose ether includes alkyl cellulose ethers and hydroxyalkyl cellulose ethers. As particular examples, cellulose ether includes any one or combination of more than one of the following: methyl cellulose, ethyl cellulose, hydroxyethyl methylcellulose, hydroxypropyl methylcellulose, hydroxyethyl methylcellulose, ethylhydroxy ethylcellulose, and hydroxybutyl methylcellulose. Of particular interest are alkylcellulose ethers such as methyl cellulose and hydroxypropyl methylcellulose.

The initial cellulose ether of the present invention desirably has a viscosity of 1,000 milliPascal*second (mPa*s) or higher, typically 2,000 mPa*s or higher, 3,000 mPa*s or higher, 4,000 mPa*s or higher, 5,000 mPa*s or higher, 10,000 mPa*s or higher, 20,000 mPa*s or higher, 30,000 mPa*s or higher, 40,000 mPa*s or higher, 50,000 mPa*s or higher, 75,000 mPa*s or higher, 100,000 mPa*s or higher, 200,000 mPa*s or higher, and even 300,000 mPa*s or higher. There is no known technical upper limit on viscosity, but the initial cellulose ether typically has a viscosity of 500,000 mPa*s or less, 400,000 mPa*s or less, 350,000 mPa*s or less, 300,000 mPa*s or less, 200,000 mPa*s or less, 100,000 mPa*s or less, 50,000 mPa*s or less, 20,000 mPa*s or less, 10,000 mPa*s or less and can have a viscosity of 9,000 mPa*s or less, 8,000 mPa*s or less, 7,000 mPa*s or less, 6,000 mPa*s or less and even 5,000 mPa*s or less. Herein, determine viscosity at 20° C. for a cellulose ether by preparing a 2 weight-percent (wt %) aqueous solution of the cellulose ether by the method set forth in USP40-NF35, page 4552 under "Hypromellose".

The initial cellulose ether is in powder form (that is, a cellulose ether powder). That means the initial cellulose ether is in particulate form. Desirably, the initial cellulose ether is a free-flowing powder that is pourable and flowable. Typically, the initial cellulose ether has a volume average particle size of 10 micrometers or more, preferably 20 micrometers or more and more preferably 30 micrometer or more and even more preferably 40 micrometers or more while at the same time is typically 1000 micrometers or less, preferably 750 micrometers or less, more preferably 500 micrometers or less and even more preferably 250 micrometers or less. Determine average particle size by light scattering.

The initial cellulose ether contains water (that is, moisture). Desirably, the initial cellulose ether comprises water at a concentration of 0.5 wt % or more, and can have a water concentration of 0.6 wt % or more 0.7 wt % or more, 0.8 wt % or more, 0.9 wt % or more, 1.0 wt % or more, 2.0 wt % or more, 3.0 wt % or more, 4.0 wt % or more, 5.0 wt % or more, 6.0 wt % or more, 7.0 wt % or more, 8.0 wt % or more and even 9.0 wt % or more while at the same time is typically 10 wt % or less and can be 9.0 wt % or less, 8.0 wt % or less, 7.0 wt % or less, 6.0 wt % or less, 5.0 wt % or less, 4.0 wt % or less, 3.0 wt % or less, 2.0 wt % or less and even 1.0 wt % or less. Determine concentration of water in the initial cellulose ether by the method set forth in USP40-NF35, page 4552 under "Hypromellose". The wt % water is based on the total weight of the moist cellulose ether.

The initial cellulose ether is heated to a temperature (reaction temperature) of 30 degrees Celsius (° C.) or higher and can be heated to a temperature that is 40° C. or higher, 50° C. or higher, 60° C. or higher, 70° C. or higher, 80° C. or higher, 90° C. or higher and even 100° C. or higher while at the same time is typically 130° C. or lower, and can be 120° C. or lower, 110° C. or lower, 100° C. or lower, 90° C. or lower, 80° C. or lower and even 70° C. or lower. Typically, the reaction temperature is maintained within +/−5° C. throughout the process once the reaction temperature is achieved.

Higher temperatures are desirable for faster hydrolysis reaction rates and, in the present invention, can be tolerated more than in processes where acid is added without base being present (acid-first process). Acid-first processes experience rapid hydrolysis making it difficult to accurately and precisely hitting target intermediate viscosity cellulose ether products and increasing reaction temperature only makes that hydrolysis faster and the target viscosity more difficult to hit. In the present process, the reaction rate is tempered by the presence of base that compete with the hydrolysis reaction for the acid. The presence of the base allows greater control over the reaction relative to the acid-first process because neutralization of acid by the base is occurring at the same time as acid-catalyzed hydrolysis. Hence, the present invention allows use of higher reaction temperatures without detrimentally hindering achieving target final product viscosities.

Before, during, and/or after heating the initial cellulose ether add a solid base to the initial cellulose ether and mix them together to form a cellulose ether/base mixture. That means that base can be added to the initial cellulose ether before heating, while heating, after heating, or at any combination of these periods of time. Desirably, the solid base is mixed with the initial cellulose ether so as to form a uniform cellulose ether/base mixture prior to the subsequent step of adding volatile acid.

The solid base can be any one or any combination of more than one base selected from a group consisting of bicarbonate salts (such as sodium bicarbonate), carbonate salts (such as sodium carbonate and/or potassium carbonate), basic alumina, weak base resins (such as trialkylamine-containing resins) and strong base resins (such as tetra-alkyl ammonium hydroxyl containing resins). Sodium bicarbonate is a particularly desirable solid base for use in the present invention.

Add volatile acid to the cellulose ether/base mixture and mix the acid with the cellulose ether/base mixture. The acid catalyzes the hydrolysis of the initial cellulose ether into a lower viscosity cellulose ether. Without being bound by theory, the presence of solid base at the time the volatile acid is introduced presumably tempers the rate of hydrolysis while the acid is mixed into the cellulose ether/base mixture thereby providing for a more homogeneous distribution of acid throughout the cellulose ether/base mixture before extensive hydrolysis occurs. Homogeneous distribution of acid through the cellulose ether/base mixture allows for a homogeneous hydrolysis of the cellulose ether. A homogeneous hydrolysis is desirable to help avoid excessively localized hydrolysis due to high local acid concentration.

Additionally, without being bound by theory, the competition for the acid between neutralization by base and catalyzing the hydrolysis tends to slow the hydrolysis process thereby allowing easier targeting of a final cellulose ether viscosity.

Even more, because the base is distributed throughout the initial cellulose ether before adding acid the quenching of the hydrolysis reaction occurs at a more predictable point and more homogeneously because base does not have to be mixed into a hydrolysis reaction as it is occurring to quench the acid.

The volatile acid desirably is any one or any combination of more than one acid selected from a group consisting of hydrogen halide and formic acid. Exemplary hydrogen halides include hydrogen fluoride, hydrogen chloride, hydrogen bromide, and hydrogen iodide. Desirably, the volatile acid is hydrogen chloride. The volatile acid is desirably anhydrous to avoid introducing moisture that may need to be removed at a later time.

Desirably, add volatile acid to a concentration of 0.05 wt % or more, 0.06 wt % or more, 0.07 wt % or more 0.08 wt % or more, 0.09 wt % or more, 0.10 wt % or more, 0.12 wt % or more, 0.15 wt % or more, 0.18 wt % or more, 0.20 wt % or more, 0.22 wt % or more, 0.24 wt % or more, 0.26 wt % or more, 0.28 wt % or more, or even 0.30 wt % or more while at the same time preferably 1.0 wt % or less, 0.90 wt % or less, 0.80 wt % or less, 0.70 wt % or less, 0.60 wt % or less, 0.50 wt % or less, 0.45 wt % or less, 0.40 wt % or less, 0.35 wt % or less, 0.30 wt % or less, 0.28 wt % or less, 0.26 wt % or less, 0.24 wt % or less, 0.22 wt % or less and even 0.20 wt % or less acid relative to initial cellulose ether powder weight.

The amount of solid base added to the initial cellulose ether powder to form the cellulose ether/base mixture is calculated relative to the amount of volatile acid that will be added to the cellulose ether/base mixture. Desirably, the moles of solid base added to the initial cellulose ether to form the cellulose ether/base mixture is 0.25 or more, 0.3 or more, 0.4 or more, 0.5 or more, 0.6 or more, 0.7 or more, 0.8 or more, 0.9 or more, 1.0 or more, and even 1.1 or more times the number for moles of volatile acid added to the cellulose ether/base mixture. At the same time, the moles of solid base added to the initial cellulose ether to form the cellulose ether/base mixture is typically 2.0 or less, 1.5 or less, 1.4 or less, 1.3 or less, 1.2 or less, 1.1 or less, or even 1.0 or less times the number of moles of volatile acid added to the cellulose ether/base mixture.

After adding the volatile acid to the cellulose ether, allow the volatile acid to hydrolyze the initial cellulose ether to form a final cellulose ether having a lower viscosity than the initial cellulose ether. Desirably, continue mixing the cellulose ether/base mixture and the volatile acid as the hydrolysis reaction occurs. The hydrolysis reaction is complete and the final cellulose ether is formed when the cellulose ether product is stable, as evidenced by two samples of cellulose ether collected from the hydrolysis reaction one hour apart have a viscosity within 5% of one another.

The viscosity of the final cellulose ether is lower than the viscosity of the initial cellulose ether. Provided that the final cellulose ether viscosity is lower than the initial cellulose ether viscosity, regardless of the viscosity of the initial cellulose ether the final cellulose ether desirably has a viscosity of 25,000 mPa*s or less, 20,000 mPa*s or less, 15,000 mPa*s or less, 12,000 mPa*s or less, 10,000 mPa*s or less, 9,000 mPa*s or less, 8,000 mPa*s or less, 7,000 mPa*s or less, 6,000 mPa*s or less, preferably 5,000 mPa*s or less, 4,000 mPa*s or less, 3,500 mPa*s or less, 3,000 mPa*s or less, 2,500 mPa*s or less, 2,000 mPa*s or less, 1,500 mPa*s or less, 1,000 mPa*s or less, 900 mPa*s or less, 800 mPa*s or less, 700 mPa*s or less, 600 mPa*s or less, 500 mPa*s or less, 400 mPa*s or less, 300 mPa*s or less or even 100 mPa*s or less while at the same time is typically one mPa*s or more, 2 mPa*s or more, 3 mPa*s or more, 5 mPa*s or more, 10 mPa*s or more, 20 mPa*s or more, 30 mPa*s or more, 40 mPa*s or more, 50 mPa*s or more, 75 mPa*s or more, preferably 100 mPa*s or more and can be 200 mPa*s or more, 300 mPa*s or more, 400 mPa*s or more, 500 mPa*s or more, 600 mPa*s or more, 700 mPa*s or more, 800 mPa*s or more, 900 mPa*s or more and even 1,000 mPa*s or more. Determine viscosity at 20° C. for a cellulose ether by preparing a 2 weight-percent (wt %) aqueous solution of the cellulose ether by the method set forth in USP40-NF35, page 4552 under "Hypromellose".

The process of the present invention can include addition of additional solid base to the cellulose ether/base mixture during and/or after addition of the volatile acid. Additionally, or alternatively, additional solid base can be added to the final cellulose ether to modify its pH. Additional solid base can be used to increase the final pH of the resulting product and/or increase the rate of quenching of the acid and, hence, the hydrolysis reaction.

Typically, the final cellulose ether has a pH of 5.0 or more, and can have a pH of 5.5 or more 6 or more, 6.5 or more, 7 or more, 7.5 or more while at the same time typically has a pH of 8 or less, 7.5 or less, 7 or less, and even 6.5 or less. Determine pH of the final cellulose ether by the method set forth in USP40-NF35, page 4552 under "Hypromellose".

Desirably, all of the steps of the present process are carried out in the same reactor. That is, the entire process desirably occurs in a single reactor. It is desirable to maintain mixing throughout the process from addition of the solid base through to completion of the hydrolysis reaction to form final cellulose ether in order to continually seek to attain homogeneity of the components in the reactor.

A benefit of the present process is that it produces cellulose ether having relatively low formaldehyde content. The final cellulose ether typically has a formaldehyde concentration of 20 weight-parts or less, preferably 15 weight-parts or less, more preferably 10 weight-parts or less, even more preferably 9 weight-parts or less, yet more preferably 8 weight-parts or less, 7 weight-parts or less, 6 weight-parts or less, 5 weight-parts or less, 4 weight-parts or less, 3 weight-parts or less, 2 weight-parts or less and even one weight-part or less per million weight parts final cellulose ether directly upon completion of hydrolysis without acting to remove formaldehyde. At the same time, the final cellulose ether is desirably free of formaldehyde but can contain one weight-part or more, 2 weight-parts or more, 3 weight-parts or more, 4 weight-parts or more or even 5 weight-parts or more formaldehyde per million weight-parts final cellulose ether. This is in contrast to some other intermediate viscosity (250-4000 mPa*s) cellulose ether materials that are commercially available having formaldehyde concentrations of 75 weight-parts or more, 80 weight-parts or more, 90 weight-parts or more, 100 weight-parts or more, 120 weight parts or more 150 weight-parts or more even 175 weight-parts or more based on million weight-parts cellulose ether. Formaldehyde is an undesirable component in cellulose ether, particularly food-grade and pharmaceutical-grade cellulose ether. So the process of the present invention provides not only greater control in achieving a target final cellulose ether viscosity but in achieving a cellulose ether product, particularly low to intermediate viscosity cellulose ether product, that has less formaldehyde than other cellulose ether products having a comparable viscosity. Determine the formaldehyde content (that is, "free formaldehyde") of the final cellulose ether by organic extraction, derivatization with dinitrophenylhydrazine and high performance liquid chromatography. A method similar to that described in Journal of Chromatography B, 879 (2011) 1282-1289 is suitable.

EXAMPLES

Starting Cellulose Ethers

Table 1 describes the cellulose ethers used as starting materials for the following Examples (Exs) and Comparative Examples (Comp Exs) in terms of degree of substitution of methoxy and hydroxypropyl groups as well as the viscosity of the cellulose ether. Degree of substitution is reported in wt % of substituent group relative to cellulose ether weight. The materials are available from The Dow Chemical Company under the trade name METHOCEL™ (METHOCEL is a trademark of The Dow Chemical Company).

| Cellulose Ether | Methoxy (wt %) | Hydroxypropyl (wt %) | Viscosity (mPa * s) |
| --- | --- | --- | --- |
| A4M | 27.5-31.5 | 0 | 2663-4970 |
| E4M | 28-30 | 7-12 | 2663-4970 |
| K4M | 19-24 | 4-12 | 2663-4970 |
| K15M | 19-24 | 4-12 | 13,275-24,780 |
| K100M | 19-24 | 4-12 | 75,000-140,000 |
| K300M* | 19-24 | 4-12 | 225,000-420,000 |

*Experimental Grade

Illustration of Reproducibility and Reaction Time

Examples (Exs) and Comparative Examples (Comp Exs) A-E and Examples (Exs) 1-8 illustrate attempts to produce a cellulose ether having a final viscosity of 4,000 mPa*s (K4M cellulose ether) from a higher viscosity starting (feedstock) cellulose ether.

Table 2 contains reaction temperature, mole equivalents of base (sodium bicarbonate) relative to acid, wt % acid relative to cellulose ether, reaction time and final viscosity of the stable product for each of Comp Exs A-E and Exs 1-8

"Reaction time" refers to the time from first adding acid to the cellulose ether to the time the final product is deemed stable. A final product is deemed "stable" if two samples taken one hour apart have viscosities within 5% of one another.

Comp Exs A-E—4,000 mPa*s Target Product

Prepare Comp Ex A and B according to the following process by adding acid to initiate hydrolysis of the feedstock cellulose ether prior to adding base to quench the hydrolysis. Load 40 kilograms (kg) of K300M feedstock cellulose ether (moisture content of 2 wt %) into a 1000-liter jacketed tumble reactor. Begin tumbling and heat to 70° C. Add anhydrous hydrogen chloride into the headspace of the reactor. Mix for 30 minutes. Add dry sodium bicarbonate powder and continue mixing until the reaction is deemed "stable". Record total reaction time and final viscosity. Results are in Table 2.

Comp Exs A and B are run essentially identically and yet produce final product having viscosities nearly an order of magnitude different, illustrating the poor reproducibility achieved in the known process where acid is added to initiate hydrolysis and then quenched with subsequent addition of base.

Comp Exs C-E are similar to Comp Exs A and B except for the amount of acid used in the reaction. Comp Exs C-E illustrate the dramatic effect minor changes in amounts of acid have on the final viscosity of the final product in the known reaction process where acid is added to initiate hydrolysis and then quenched with subsequent addition of base.

The poor reproducibility and extreme sensitivity of final viscosity on reaction conditions is a result of the rapid drop in viscosity during hydrolysis illustrated in the curve of FIG. 1. It is very difficult to control the hydrolysis reaction and stop it at a precise point along the curve when acid is added prior to base and then base is added to quench the hydrolysis.

Notably, it also takes 4.5 hours for the reaction to run— that is to produce a product having a stable viscosity.

Exs 1-8—4,000 mPa*s Target Product

Prepare Exs 1-8 according to the following process, a process of the present invention where base is added to the feedstock cellulose ether prior to adding acid to initiate hydrolysis.

Load 50 kg of K100M feedstock cellulose ether (moisture content of 2 wt %) and dry sodium bicarbonate powder (1.25 mole equivalents relative to moles of anhydrous hydrogen chloride to be added) into a 1000-liter jacketed tumble reactor to form a feedstock/base mixture. Tumble the feedstock/base mixture and heat to the reaction temperature (see Table 2). Add anhydrous hydrogen chloride (see Table 2) into the headspace of the reactor. Continue to tumble the resulting mixture until a stable product is achieved. Record reaction time and final product viscosity. Results are in Table 2.

Examples 4-8 illustrate approximately 16% deviation in final viscosity over five reproduced reactions, illustrating the high degree of reproducibility for a targeted viscosity using a process of the present invention.

Examples 1-8 illustrate that the final viscosity of product obtained by process of the present invention is much less sensitive to process variables such as acid concentration and reaction temperature than the known process as illustrate in Comp Exs A-E.

Examples 1-8 further illustrate that the benefits of reproducibility and decreased sensitivity to reaction conditions is achieved in combination with a faster reaction time than that of Comp Exs A-E. Notably, due to the very rapid initial reduction in viscosity at the start of the hydrolysis reaction (see FIG. 1) the higher feedstock viscosity in Comp Exs A-E has a negligible contribution to reaction time when compared to the reaction times of Exs 1-6.

TABLE 2

| Sample | Feedstock | Rxn Temp (° C.) | mol eq. NaHCO3 | wt % HCl | Rxn Time (hours) | Final Viscosity (mPa*s) | Final pH |
| --- | --- | --- | --- | --- | --- | --- | --- |
| Comp Ex A | K300M | 70 | 1.14 | 0.07 | 4.6 | 170,000 | 6.1 |
| Comp Ex B | K300M | 70 | 1.15 | 0.07 | 4.5 | 22,000 | 6.1 |
| Comp Ex C | K300M | 70 | 1.14 | 0.05 | 4.6 | 128,000 | 6.0 |
| Comp Ex D | K300M | 70 | 1.14 | 0.08 | 4.6 | 4450 | 6.2 |
| Comp Ex E | K300M | 70 | 1.14 | 0.09 | 4.6 | 600 | 6.2 |
| Ex 1 | K100M | 55 | 1.25 | 0.13 | 4.0 | 4,000 | 6.9 |
| Ex 2 | K100M | 55 | 1.25 | 0.14 | 4.0 | 4,100 | 7.0 |
| Ex 3 | K100M | 57 | 1.25 | 0.13 | 4.0 | 3,300 | 7.0 |
| Ex 4 | K100M | 50 | 1.25 | 0.10 | 4.0 | 3,800 | 6.9 |
| Ex 5 | K100M | 50 | 1.25 | 0.10 | 4.0 | 3,900 | 6.9 |
| Ex 6 | K100M | 50 | 1.25 | 0.10 | 4.5 | 3,800 | 6.9 |

TABLE 2-continued

| Sample | Feedstock | Rxn Temp (° C.) | mol eq. NaHCO3 | wt % HCl | Rxn Time (hours) | Final Viscosity (mPa*s) | Final pH |
|---|---|---|---|---|---|---|---|
| Ex 7 | K100M | 50 | 1.25 | 0.10 | 4.0 | 4,500 | 6.7 |
| Ex 8 | K100M | 50 | 1.25 | 0.10 | 4.0 | 4,100 | 6.8 |

Examples 9-16—15,000 mP*s Target Product

Prepare Exs 9-16 in similar manner as Exs 1-8 except use the conditions indicated in Table 3. Exs 9-16 target a final product viscosity of 15,000 mPa*s, which is a more difficult final viscosity to achieve reproducibly because it is occurs during a more rapid drop in viscosity during the hydrolysis reaction than the 4,000 mPa*s target of Exs 1-8 and Comp Exs A-E (see FIG. 1). Nonetheless, the data in Table 3 shows that the process of the present invention achieves reproducible results of a target 15,000 mPa*s product. The data further reveals that the process of the present invention remains largely unaffected by a 20% variation in the amount of acid used during the hydrolysis reaction.

TABLE 3

| Sample | Feedstock | Rxn Temp (° C.) | mol eq. NaHCO3 | wt % HCl | Rxn Time (hours) | Final Viscosity (mPa*s) | Final pH |
|---|---|---|---|---|---|---|---|
| Ex 9 | K100M | 45 | 1.25 | 0.08 | 4.0 | 15,100 | 6.8 |
| Ex 10 | K100M | 43 | 1.25 | 0.08 | 4.0 | 19,500 | 6.7 |
| Ex 11 | K100M | 43 | 1.25 | 0.08 | 4.0 | 21,000 | 7.1 |
| Ex 12 | K100M | 45 | 1.25 | 0.10 | 4.0 | 16,500 | 7.0 |
| Ex 13 | K100M | 45 | 1.25 | 0.10 | 4.0 | 14,800 | 6.9 |
| Ex 14 | K100M | 44 | 1.25 | 0.10 | 4.5 | 18,100 | 6.8 |
| Ex 15 | K100M | 45 | 1.25 | 0.10 | 4.0 | 15,300 | 6.7 |
| Ex 16 | K100M | 45 | 1.25 | 0.10 | 4.0 | 18,000 | 6.7 |

Examples 17-29—Versatility of Inventive Process

Examples 17-29 illustrate processes of the present invention using a variety of different feedstocks, feedstock moisture contents, bases, reaction temperatures, mole equivalents of base, and concentrations of acid as well as achieving a variety of different final viscosities. Table 4 contains reaction conditions and results for Examples 17-29.

Prepare Examples 17-29 using the following procedure. Load 800 g of the feedstock cellulose ether and base into a 7-liter glass reactor. Rotate the reactor in an oven and heat to the reaction temperature and allow the contents of the reactor to equilibrate at the reaction temperature for one hour. Add the anhydrous hydrogen chloride to the headspace of the reactor and rotate until a stable product is achieved. Record reaction time and final product viscosity. Results are in Table 4.

The data in Table 4 illustrates examples of process of the present invention that can achieve a variety of different final viscosities and use a variety of different feedstocks, feedstock moisture contents, bases, reaction temperatures, base concentrations and acid concentrations.

TABLE 4

| Sample | Feedstock | Feedstock moisture (wt %) | Base | Rxn Temp (° C.) | mol eq. NaHCO3 | wt % HCl | Rxn Time (hours) | Final Viscosity (mPa*s) | Final pH |
|---|---|---|---|---|---|---|---|---|---|
| Ex 17 | K100M | 2.0 | NaHCO$_3$ | 45 | 1.25 | 0.1 | 4.0 | 16,496 | 7.0 |
| Ex 18 | K100M | 2.0 | NaHCO$_3$ | 50 | 1.25 | 0.1 | 4.0 | 4,119 | 6.9 |
| Ex 19 | K100M | 2.0 | NaHCO$_3$ | 60 | 1.10 | 0.25 | 3.0 | 140 | 6.2 |
| Ex 20 | K4M | 1.8 | NaHCO$_3$ | 77 | 0.84 | 0.5 | 1.5 | 68 | 6.5 |
| Ex 21 | K4M | 1.8 | NaHCO$_3$ | 77 | 0.81 | 0.5 | 3.0 | 67 | 6.9 |
| Ex 22 | K4M | 1.8 | NaHCO$_3$ | 77 | 0.77 | 0.5 | 3.0 | 63 | 6.6 |
| Ex 23 | K4M | 1.8 | NaHCO$_3$ | 77 | 0.68 | 0.5 | 3.0 | 34 | 7.0 |
| Ex 24 | K4M | 1.8 | NaHCO$_3$ | 77 | 0.51 | 0.5 | 3.0 | 8 | 6.6 |
| Ex 25 | K4M | 1.8 | NaHCO$_3$ | 77 | 0.43 | 0.5 | 3.0 | 6 | 7.0 |
| Ex 26 | K4M | 4.1 | NaHCO$_3$ | 89 | 1.21 | 0.3 | 3.0 | 191 | 6.1 |
| Ex 27 | K4M | 1.7 | Na$_2$CO$_3$ | 89 | 0.60 | 0.3 | 3.0 | 2 | 7.9 |
| Ex 28 | A4M | 2.1 | NaHCO$_3$ | 85 | 1.20 | 1.5 | 1.5 | 20 | 6.6 |
| Ex 29 | E4M | 1.9 | NaHCO$_3$ | 85 | 1.20 | 1.5 | 1.5 | 15 | 6.7 |

Example 30 and Comparative Examples F-H—Formaldehyde

Prepare Example 30 using the following procedure. Load 800 g of the K4M cellulose ether feedstock and 6.6 g of sodium bicarbonate powder base into a 7-liter glass reactor. Rotate the reactor in an oven and heat to an 85° C. reaction temperature and allow the contents of the reactor to equilibrate at the reaction temperature for one hour. Add 0.3 wt % (based on feedstock cellulose ether) anhydrous hydrogen chloride to the headspace of the reactor and rotate until a stable product is achieved. Reaction time is 1.5 hours. Final product viscosity is 197 mPa*s and final pH of 6.8. The product of Example 30 has a formaldehyde concentration of 11 weight-parts per million weight parts of final product.

Comparative Examples F-H correspond to commercially available cellulose ether products commercially available as BENECEL™ K250, K750 and K1500 water soluble polymers respectively (BENECEL is a trademark of Hercules LLC). Comp Ex F (BENECEL K250) has a viscosity of 259 mPa*s and a formaldehyde concentration of 184 weight-parts per million weight parts product. Comp Ex G (BENECEL K750) has a viscosity of 752 mPa*s and a formaldehyde concentration of 128 weight-parts per million weight parts product. Comp Ex H (BENECEL K1500) has a viscosity of 1800 mPa*s and a formaldehyde concentration of 89 weight-parts per million weight parts product.

Ex 30 and Comp Exs F-H illustrate that the process of the present invention produces cellulose ether product having significantly lower formaldehyde concentrations than commercially available cellulose ethers having similar viscosities.

What is claimed is:

1. A process comprising:
   (a) providing an initial cellulose ether powder comprising 0.5 to 10 weight-percent water based on total cellulose ether powder weight;
   (b) heating the initial cellulose ether powder to a temperature in a range of 30 to 130 degrees Celsius;
   (c) before, during and/or after heating in step (b), adding a solid base to the initial cellulose ether powder and mixing the solid base with the initial cellulose ether powder to form a uniform mixture of the solid base and the initial cellulose ether powder;
   (d) adding a volatile acid to the cellulose ether/base mixture and mixing; and
   (e) allowing the volatile acid to hydrolyze the initial cellulose ether to form a final cellulose ether having a lower viscosity than the initial cellulose ether,
   wherein the solid base is selected from the group consisting of bicarbonate salts, carbonate salts, basic alumina, weak base resins, strong base resins, and mixtures thereof.

2. The process of claim 1, wherein the amount of the volatile acid added in step (d) is 0.08 to 0.5 weight-percent based on initial cellulose ether powder weight and the molar amount of the solid base added in step (c) is 0.4 to 1.25 times the number of moles of the volatile acid added in step (d).

3. The process of claim 1, wherein an additional base is added after adding the volatile acid in step (d).

4. The process of claim 1, wherein the initial cellulose ether powder is selected from the group consisting of methyl cellulose, hydroxypropyl methylcellulose, and mixtures thereof.

5. The process of claim 1, wherein the solid base is dry sodium bicarbonate powder.

6. The process of claim 5, wherein the volatile acid is anhydrous hydrogen chloride.

7. The process of claim 1, wherein the initial cellulose ether powder has viscosity of more than 2,000 millipascal*seconds.

8. The process of claim 1, wherein the final cellulose ether has a viscosity in a range of one to 25,000 millipascal*seconds.

9. The process of claim 8, wherein the final cellulose ether has a viscosity in a range of one to 4,000 millipascal*seconds.

10. The process of claim 1, wherein the final cellulose ether has a pH in a range of 5-8.

11. The process of claim 1, wherein the final cellulose ether comprises less than 20 weight-parts formaldehyde per million weight-parts final cellulose ether without a step of removing formaldehyde from the final cellulose ether.

12. The process of claim 1, wherein the volatile acid is selected from the group consisting of hydrogen halide, formic acid, and combinations thereof.

13. The process of claim 12, wherein the volatile acid is anhydrous hydrogen chloride.

* * * * *